US006823961B2

(12) United States Patent
Lamela et al.

(10) Patent No.: US 6,823,961 B2
(45) Date of Patent: Nov. 30, 2004

(54) SKID STEER VEHICLE WITH AXLE HOUSING HAVING A DOUBLE GEAR REDUCTION

(75) Inventors: Anthony J. Lamela, Gilberts, IL (US); Troy D. Bateman, Joliet, IL (US)

(73) Assignee: CNH America LLC, New Holland, PA (US)

( * ) Notice: Subject to any disclaimer, the term of this patent is extended or adjusted under 35 U.S.C. 154(b) by 127 days.

(21) Appl. No.: 10/136,265

(22) Filed: May 1, 2002

(65) Prior Publication Data

US 2003/0205426 A1 Nov. 6, 2003

(51) Int. Cl.$^7$ .............................................. B60K 17/30
(52) U.S. Cl. ...................... 180/305; 180/242; 180/6.48
(58) Field of Search ................. 180/6.48, 6.5, 180/242, 243, 233, 245, 246, 305, 307, 308

(56) References Cited

U.S. PATENT DOCUMENTS

| | | | |
|---|---|---|---|
| 2,257,772 A | | 10/1941 | Wolf |
| 2,311,922 A | | 2/1943 | Allin |
| 3,115,936 A | * | 12/1963 | Blews, Jr. .................... 416/120 |
| 3,635,365 A | | 1/1972 | Bauer |
| 3,810,517 A | * | 5/1974 | Hurlburt et al. ............. 180/246 |
| 3,905,251 A | * | 9/1975 | Greene ......................... 475/72 |
| 3,907,053 A | * | 9/1975 | Savage ....................... 180/6.48 |
| 4,168,757 A | | 9/1979 | Mather et al. |
| 4,407,381 A | * | 10/1983 | Oswald et al. ............. 180/6.48 |
| 4,597,468 A | * | 7/1986 | Friedrich ..................... 180/255 |
| 4,763,751 A | * | 8/1988 | Gardner, Jr. ................ 180/305 |
| 4,955,455 A | | 9/1990 | Albright et al. |
| 4,962,821 A | * | 10/1990 | Kim ........................... 180/6.48 |
| 4,962,825 A | * | 10/1990 | Albright et al. ............. 180/292 |
| 5,768,955 A | * | 6/1998 | Hauser ....................... 74/606 R |
| 5,964,567 A | | 10/1999 | Bamford |
| 6,182,780 B1 | * | 2/2001 | Brookins ..................... 180/242 |
| 6,182,784 B1 | | 2/2001 | Pestotnik |
| 6,216,812 B1 | | 4/2001 | Pertusi |
| 6,425,453 B1 | * | 7/2002 | Knutson et al. ............. 180/256 |
| 6,513,614 B2 | * | 2/2003 | Knutson et al. ............. 180/242 |
| 6,634,445 B2 | | 10/2003 | Felsing et al. |
| 6,650,985 B2 | | 11/2003 | Lin et al. |
| 2002/0036110 A1 | | 3/2002 | Panizzolo |
| 2003/0116936 A1 | | 6/2003 | Felsing et al. |
| 2003/0173132 A1 | | 9/2003 | Komatsu et al. |
| 2003/0188910 A1 | | 10/2003 | Bateman et al. |
| 2003/0209379 A1 | | 11/2003 | Bateman et al. |

FOREIGN PATENT DOCUMENTS

GB 2 262 264 * 6/1993 ........... B62D/11/04

* cited by examiner

*Primary Examiner*—Christopher P. Ellis
*Assistant Examiner*—Bridget Avery
(74) *Attorney, Agent, or Firm*—Collin A. Webb; John William Stader (57) ABSTRACT

A skid steer vehicle has a drive system that includes a hydraulic motor coupled to a speed-reduction gearbox. One or more drive shafts extend fore-and-aft from the gearbox and are coupled at each end to two axle housings. Each axle housing includes two reduction gear sets and an axle. Each of the axles extends outward from the vehicle and a wheel is fixed to its outer end. A spur gear on a parallel shaft inside the axle housing engages a spur gear on the axle and drives it to provide one gear reduction. A bevel gear in the axle housing engages a bevel gear on the parallel shaft to provide another gear reduction. The vehicle has a drive system located on each side of the vehicle to collectively drive four wheels.

11 Claims, 8 Drawing Sheets

FIG. 8

SKID STEER VEHICLE WITH AXLE HOUSING HAVING A DOUBLE GEAR REDUCTION

FIELD OF THE INVENTION

The invention relates generally to drive systems for skid steer vehicles. More particularly, it relates to skid steer vehicles having a direct gear drive.

BACKGROUND OF THE INVENTION

Skid steer vehicles such as skid steer loaders were invented perhaps thirty years ago to provide a small vehicle on a highly maneuverable platform for working in close quarters on construction sites. They were called "skid steer loaders" since they had fixed axles, two per side, and could drive the wheels on one side of a vehicle at one speed and the wheels on the other side of the vehicle at a second speed. To turn the vehicles, the wheels on each side of the vehicle are driven at different speed, and even in opposite directions. It is this latter mode of operation that permits the vehicles to rotate about a vertical axis.

The drive mechanisms for these vehicles rely upon the fact that, on each side of the vehicle, the wheels were driven at the same speed. Each wheel is supported by an axle and the axles on the same side of the vehicle are driven by a single motor. The axles on the other side of the vehicle are driven by a second motor.

As these vehicles have developed, the axles were quite long and extended from the outside of the vehicle through a sidewall of the vehicle and into the interior of the vehicle, where they are joined via chains to a common hydraulic motor. Since chains are subject to wear, however, they need frequent replacement at some expense. Since they are located within the sidewalls of the vehicle, the chain tank takes up space that could be better used as space for the operator. The use of chains requires a longitudinally extending chain tank or chain bucket in which oil baths the chain. Since this tank extends from forward axle to rearward axle, it extends substantially the entire length of the vehicle.

By extending all the axles into the center of the vehicle and driving them from a common central chain tank, the drive mechanism consumes considerable interior space. Furthermore, by using chains to connect the motors to the axles, the vehicles require regular chain replacement, which increases down time. What is needed, therefore, is a skid steer vehicle with a drive system that does not require a chain tank or periodic replacement of a drive chain. What is also needed is a skid steer vehicle in which the drive components have been moved to the sides of the vehicle, thereby permitting a larger internal open space. It is an object of this invention to provide such a system in one or more claimed embodiments.

SUMMARY OF THE INVENTION

In accordance with a first embodiment of the invention, a skid steer vehicle is provided that has a direct drive system eliminating the extended drive chain of the traditional skid steer vehicle and replacing it with a gear and shaft drive that couples a hydraulic motor to a forward and aft drive wheel. This arrangement is provided on both sides of the vehicle. It disposes the drive elements adjacent to the sidewalls of the vehicle thereby reducing the intrusion of drive components near the center of the vehicle.

This system includes a hydraulic motor adjacent to a sidewall of the vehicle that is mounted to a gearbox including least one set of reduction gears. This gearbox splits the output to power two drive shafts, one extending forward and one extending aft to engage two axle housings. The forward and rear axle housing each contain two sets of reduction gears to further reduce speed and increase torque.

The vehicle has two such drive systems, one disposed on either side of the vehicle that each drive two wheels arranged in a fore-and-aft orientation. Each wheel is fixed to an axle extending from and supported by a corresponding one of the axle housings.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
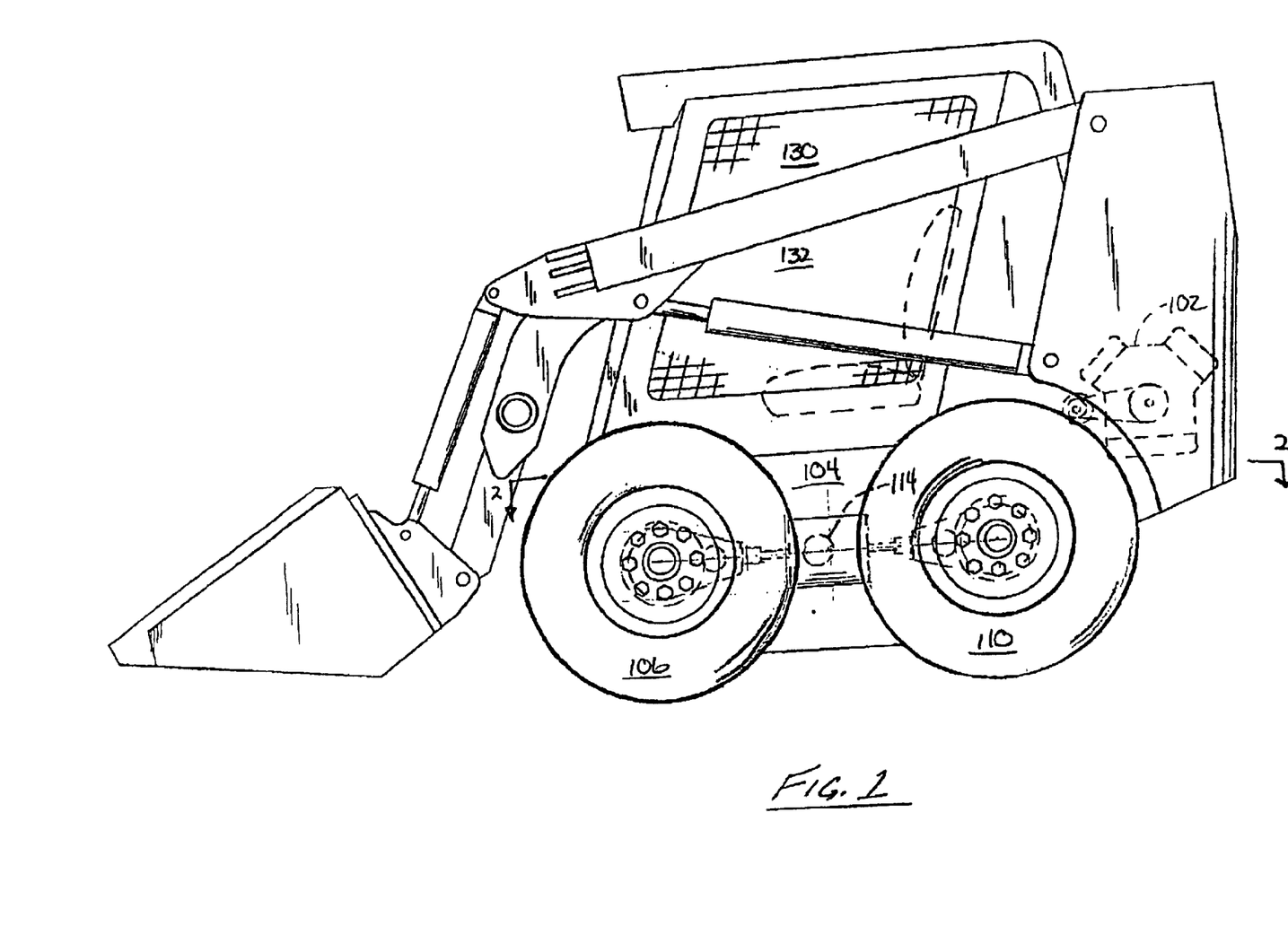
FIG. 1 is a side view of a skid steer vehicle (here shown as a skid steer loader) in accordance with the present invention.
Figure 2:
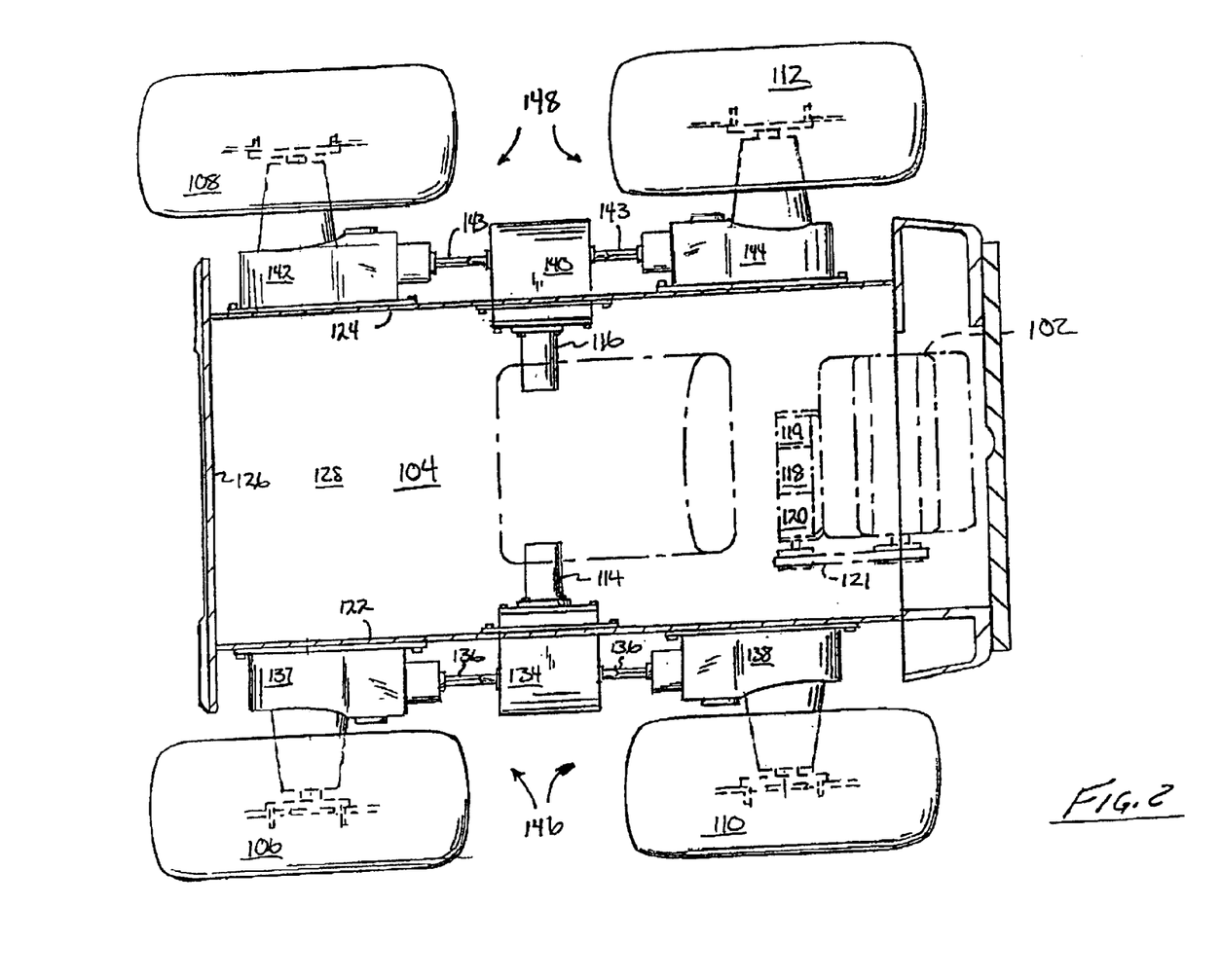
FIG. 2 is a top view of the vehicle of the preceding FIGURE taken at section line 2—2 in FIG. 1 showing the drive system.

Referring to FIGS. 1 and 2 shows a skid steer vehicle 100 having an engine 102 that is mounted on a chassis 104. The chassis 104 is supported on two front wheels 106, 108 and two rear wheels 110 and 112. Hydraulic motors 114 and 116 respectively drive two pairs of wheels 106, 110 and 108, 112, respectively. Hydraulic fluid for hydraulic motors 114 and 116 is provided by hydraulic pumps 118, 120, to which motors 114 and 116 are respectively fluidly coupled. Pumps 118 and 120 are coupled to and driven by engine 102. A charge pump 119 is also coupled to and driven by engine 102 to provide hydraulic fluid to the circuits coupling the motors and the other pumps. The hydraulic circuit can be seen in greater detail in FIG. 8.

Engine 102 is preferably an internal combustion engine such as a 2 to 6 cylinder gasoline or diesel engine. Hydraulic pumps 118 and 120 are driven by the crankshaft of engine 102, to which they are rotationally coupled by belt 121.

Chassis 104 includes two sidewalls 122 and 124 disposed on the left and the right side of the vehicle, respectively, as well as forward wall 126 and floor pan 128. The walls and the floor pan, together with engine 102 and rollover cage 130 (which is coupled to the chassis) define the general outlines of the operator's compartment 132.

Each side of the vehicle is equipped with a drive system that drives the vehicle over the ground. The drive system 146 for the left side of the vehicle includes hydraulic motor 114, gearbox 134, driveshaft 136, front and rear axle housings 137 and 138, and drive wheels 106 and 110. The drive system 148 for the right side of the vehicle includes hydraulic motor 116, gearbox 140, front and rear axle housings 142, and 144, and drive wheels 108 and 112. Drive systems 146 and 148 are mirror images of each other mirrored about a longitudinal centerline of the vehicle.

Regarding drive system 146, and as best shown in FIGS. 3–6, hydraulic motor 114 is coupled to gearbox 134, which is a speed-reducing gearbox. Shaft 150 of hydraulic motor 114 extends in a laterally, from side-to-side with respect to the vehicle and rotates whenever hydraulic fluid from hydraulic pump 118 is directed through it. Shaft 150 is coupled to and drives gear set 152, which is disposed inside the casing 154 of gearbox 134. Gear set 152 is coupled to and drives driveshaft 136.

Figure 3:
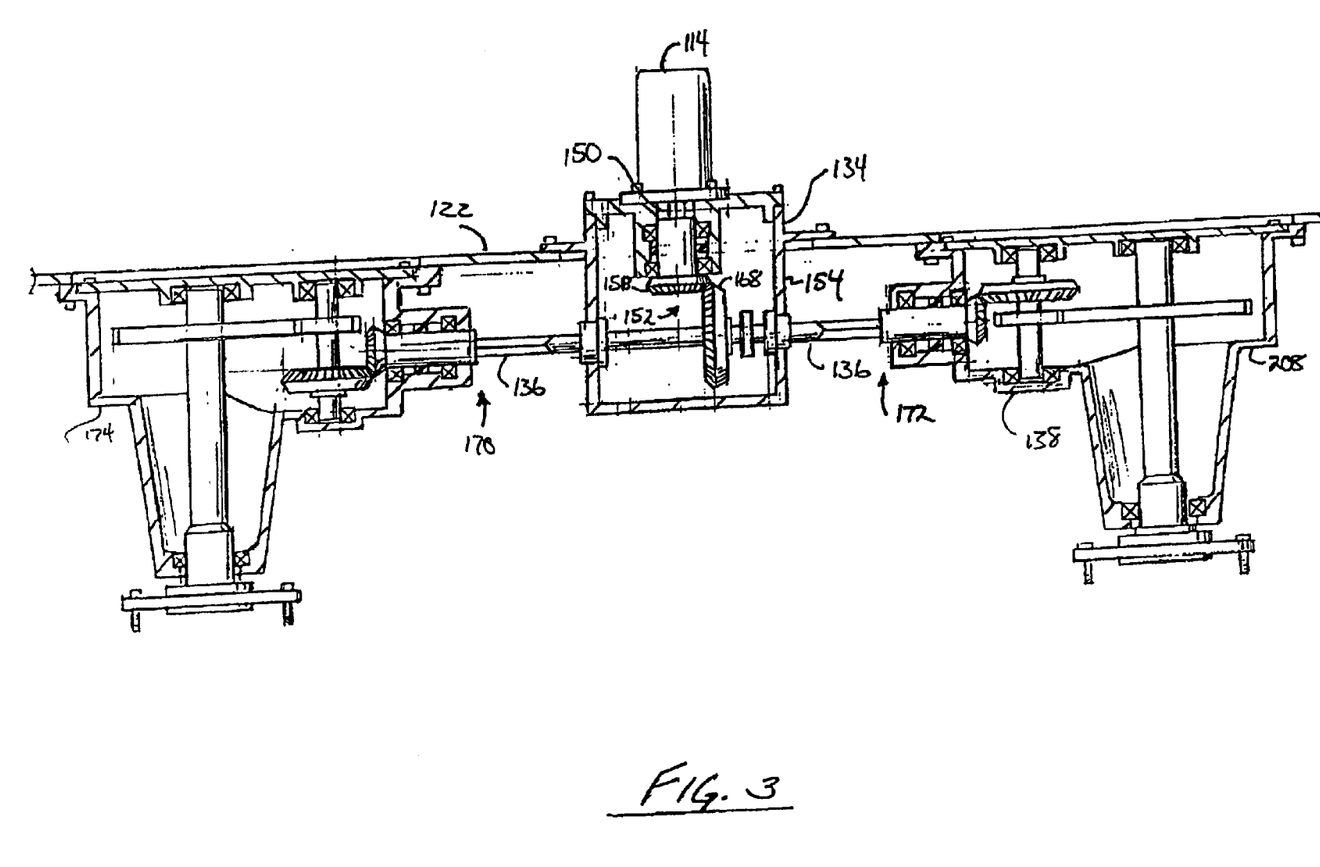
FIG. 3 is a partial cutaway view of the vehicle showing the left hand drive system in more detail, including its internal components and gears.
Figure 6:
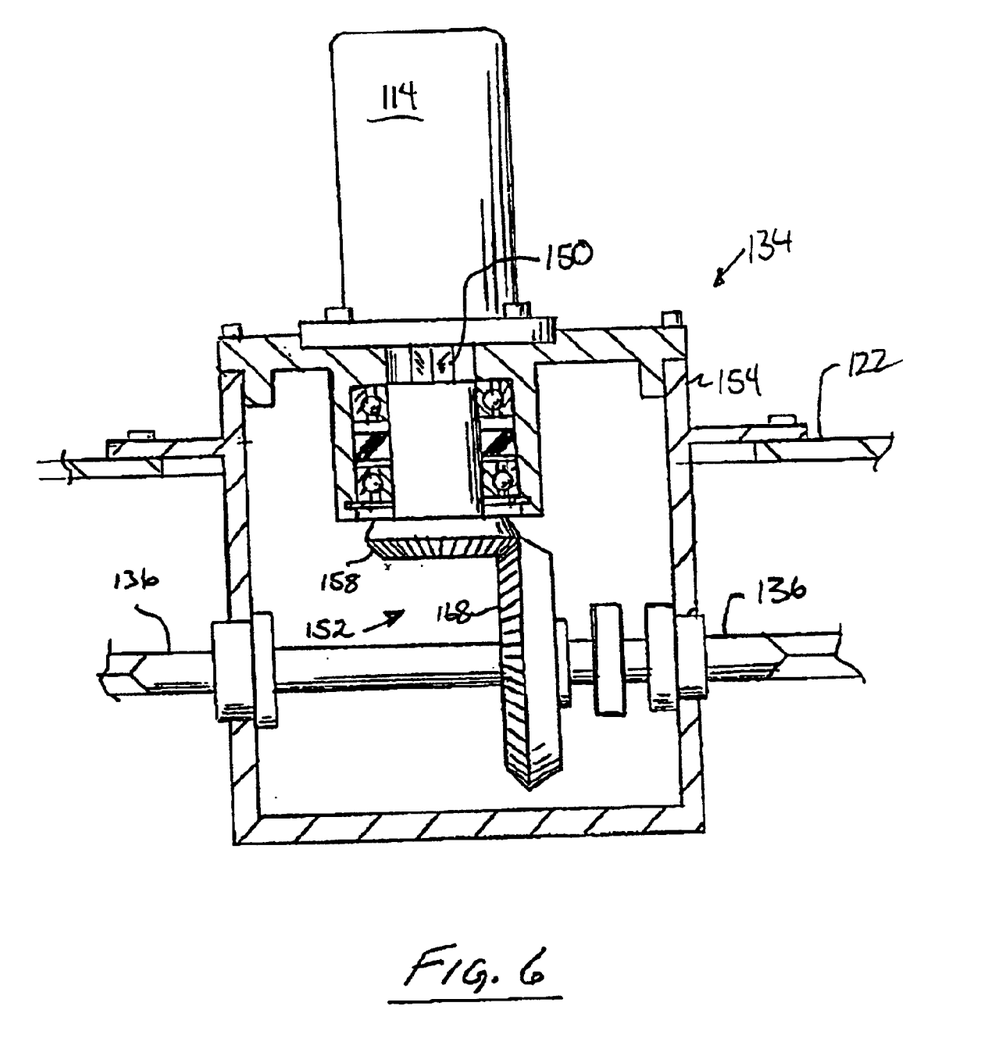
FIG. 6 is a cross sectional view of the left side hydraulic motor and gearbox showing the arrangement of the reduction gear set inside by a cutting plane that intersects the rotational axes of both the hydraulic motor and the driveshaft.

Gearbox 134 is preferably disposed to extend through an aperture or opening in sidewall 122 of the vehicle such that hydraulic motor 114 and a portion of gearbox 134 are disposed inside the sidewall in the operator's compartment, and the axle housings 137 and 138 together with a second portion of gearbox 134 are disposed outside sidewall 122 of the vehicle away from the operator's compartment.

Gear set 152 is a speed-reducing bevel gear set that includes bevel pinion gear 158 and bevel bull gear 168. Shaft 150 of motor 114 is coupled to and drives bevel pinion gear 158. Bevel pinion gear 158, in turn, drives bevel bull gear 168. These two gears are in meshing engagement. Since gear 158 has fewer teeth than gear 168, gear 168 rotates at a lower speed than gear 158. It is this difference in rotational speed that provides the speed-reducing capability of gear set 152.

Driveshaft 136 is coupled to and driven by bevel gear 168. Driveshaft 136 rotates about the same fore-and-aft oriented rotational axis about which gear 168 rotates. This axis is parallel to the ground when the chassis is stationary. The axis is also in a fixed position with respect to the chassis, since gearbox 134, and axle housings 137 and 138 are fixed with respect to the chassis and the driveshaft extends between and couples these fixed devices. In addition, driveshaft 136 is disposed farther outboard (i.e. farther away from the center of the vehicle) than motor 114.

Driveshaft 136 has two ends (FIG. 3): a first end 170 that extends through casing 154 forward of gearbox 134 toward the front of the vehicle, and a second end 172 that extends through casing 154 of gearbox 134 toward the rear of the vehicle. The forward end of the driveshaft terminates in front axle housing 137 and the rearward end of the driveshaft terminates in rear axle housing 138. Both ends of the driveshaft inherently rotate in the same direction and at the same speed.

In the preferred embodiment, shown here, the driveshaft 136 is a single elongate member that is inserted through bevel gear 168 and has hexagonal flats on each opposing end to engage bevel pinion gears in axle housings 137 and 138. The hexagonal outer surfaces of the ends of driveshaft 136 engage internal hexagonal surfaces defining the inner surface of apertures extending into the pinion gears. These mating hexagonal surfaces are sized to permit driveshaft 136 to rotate and drive the pinion gears in rotation, while preferably also permitting the ends of the driveshaft to slide laterally within and with respect to the pinion gears for easy insertion and removal of gearbox 134.

Whenever gear 168 is rotated by gear 158, driveshaft 136 is driven by bevel gear 168 in the same direction and at the same speed. In an alternative embodiment, driveshaft 136 is not fixed rigidly to gear 168, but is slidingly supported within gear 168 such that it can be removed from gearbox 134 by sliding the driveshaft back and forth within gear 168. A preferred arrangement of this system would be to support driveshaft 136 within gear 168 by mutually interengaging longitudinal flats or splines that would permit the rotation of gear 168 to be transferred as rotation of driveshaft 136, yet permit driveshaft 136 to slide longitudinally with respect to gear 168, even so far as to be entirely and slidingly removed from gearbox 134.

Figure 4:
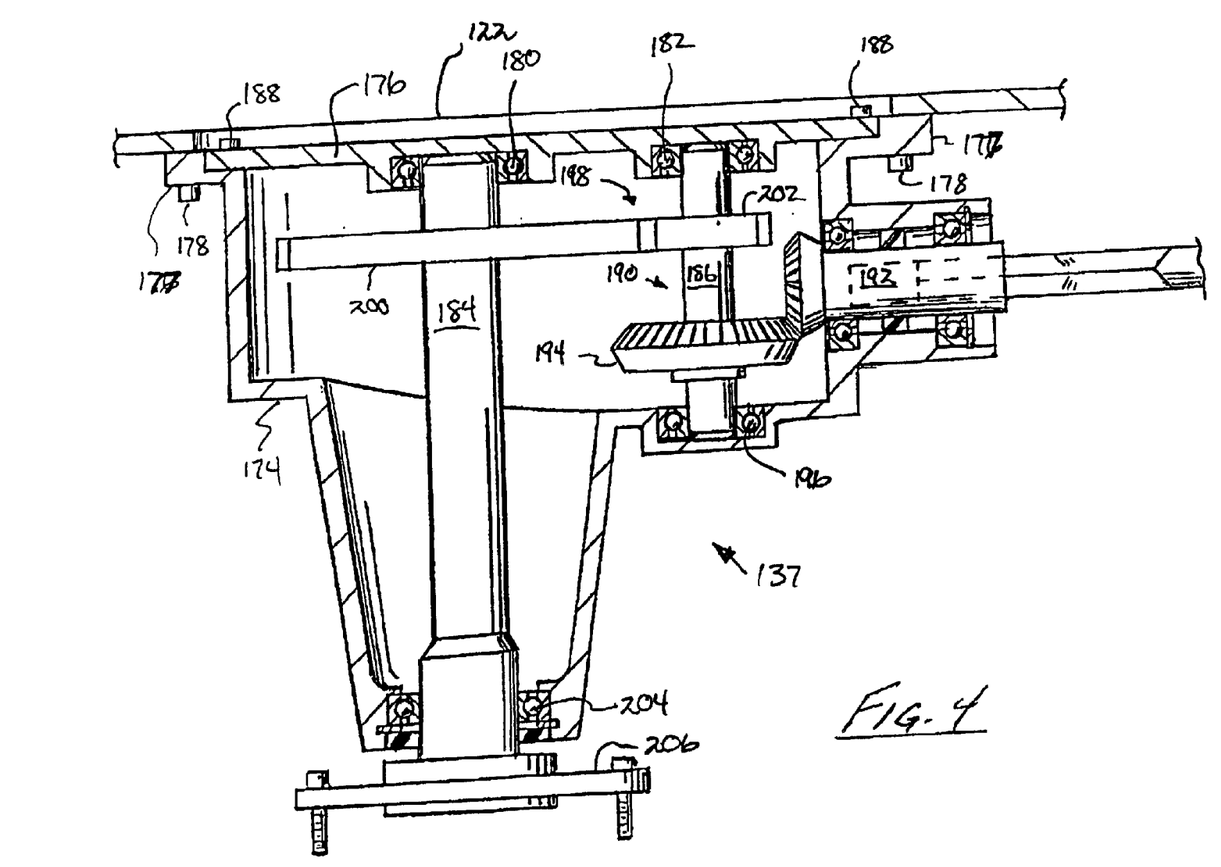
FIG. 4 is a cross-sectional view the forward axle housing of the left side drive system showing the internal components including the axle, the bevel gear set and the spur gear set.

Referring to FIGS. 3 and 4, front axle housing 137 includes an elongated generally conical casing 174 that has a smaller conical diameter the farther one moves away from the vehicle toward wheel 106. This casing 174 includes a flange 177 at its inboard end through which a plurality of bolts 178 are inserted to fix the flange (and hence casing 174) to left sidewall 122 of the vehicle.

Casing 174, like the three other casings of the vehicle, supports the weight of the vehicle as it travels over the ground. The weight of the vehicle is transmitted from the chassis to the flanges, and thence through axle bearings located in the casing to the axle. The weight on the axle is thence transmitted to the ground. Casing 174, unlike gearbox 134, is a vehicle weight-bearing structural member of the vehicle.

Axle housing 137 includes a cover 176 that is bolted to and encloses casing 174. Two bearings 180 and 182 are fixed to and supported by cover 176. These bearings, in turn support axle 184 and gear shaft 186 for rotation at their inner ends. Bolts 188 extend through holes in cover 176 into casing 174 where they are threadedly engaged with casing 174 to fix cover 176 thereto.

Axle housing 137 also includes a speed-reducing bevel gear set 190, including bevel pinion gear 192 that is coupled to and rotates with the forward end of driveshaft 136. Gear set 190 also includes bevel gear 194 that is meshingly engaged to and rotates with bevel gear 192.

Bevel gears 192 and 194 preferably rotate about axes disposed at a right angle to one another. Bevel gear 194 is supported for rotation on and is fixed to gear shaft 186. Both gear shaft 186 and driveshaft 136, which are coaxial with their associated bevel gears 194 and 192 mounted thereon, also lie in a horizontal plane and rotate about axes at right angles to one another—the same axes about which gears 192 and 194 rotate.

Gear shaft 186 is supported within axle housing 137 by two bearings 182 and 196. Bearing 196 is mounted to casing 174 itself, and bearing 182 is mounted to cover 176.

Front axle housing 137 also includes a second speed reducing spur gear set 198. This gear set is also disposed inside the front axle housing and includes two spur gears 200 and 202 that are fixed to axle 184 and gear shaft 186, respectively. The gear set is a speed reducing gear set because there are fewer teeth on gear 202 than are on gear 200. This difference in the number of teeth causes gear shaft 186 to rotate at a higher speed than axle 184, thereby providing a speed reduction.

Axle 184 is supported within casing 174 by two bearings 180 and 204 that are spaced apart with respect to each other. Cover 176 supports bearing 180 and casing 174 supports bearing 204. It is these bearings that transmit the weight of the vehicle from casing 174 to axle 184 and thence to wheel 106 and the ground.

Wheel 106 (FIG. 3) is fixed to a flange 206 that extends radially outward from the outboard end of axle 184, using a plurality of lug bolts that pass through openings in the rim of the wheel to which lug nuts are fastened.

Figure 5:
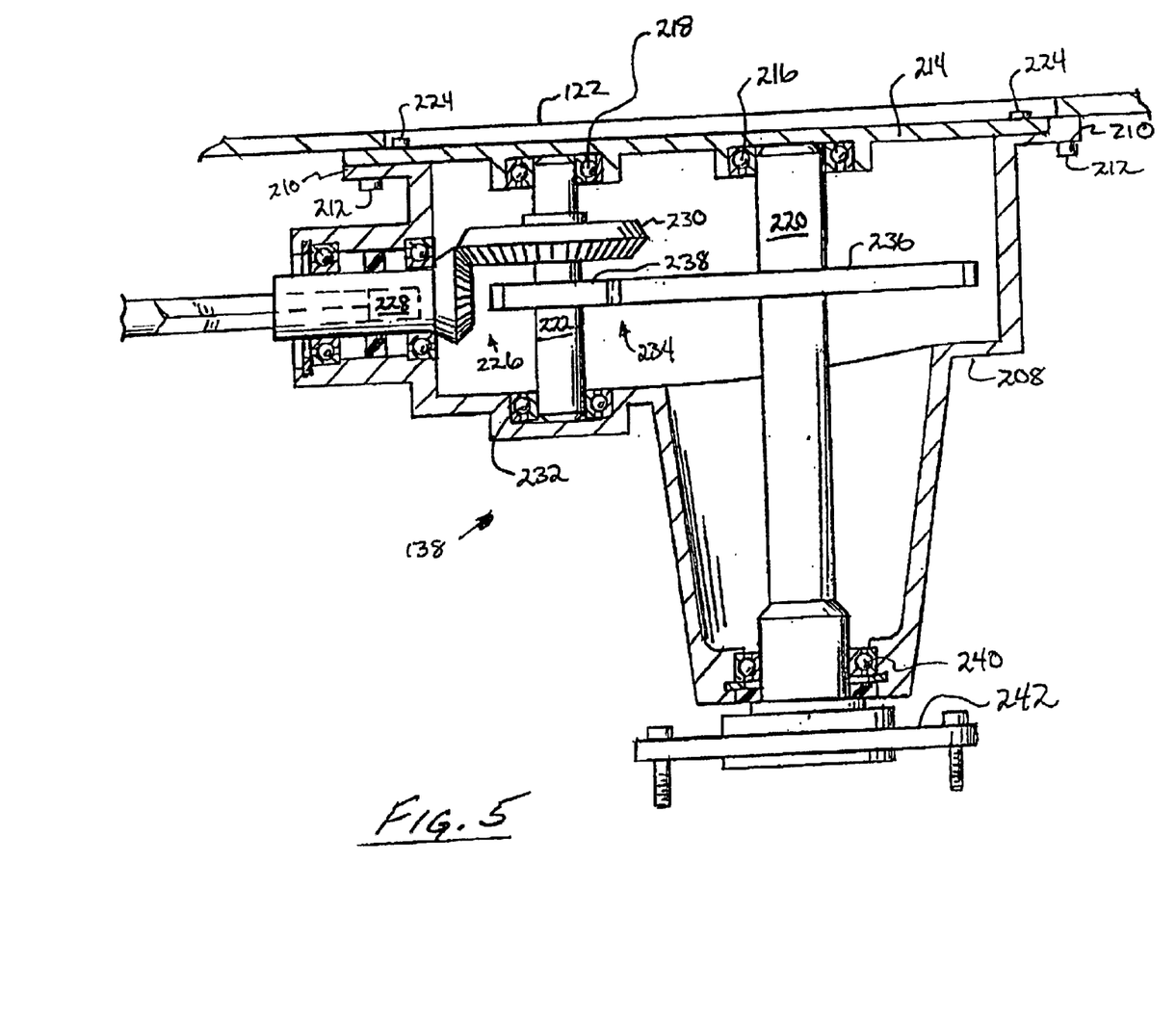
FIG. 5 is a cross-sectional view the rear axle housing of the left side drive system showing the internal components including the axle, and the bevel gear set and the spur gear set.

Referring to FIGS. 3 and 5, rear axle housing 138 includes an elongated generally conical casing 208 that has a smaller conical diameter the farther one moves away from the vehicle toward wheel 110. This casing 208 includes a flange 210 at its inboard end through which a plurality of bolts 212 are inserted to fix the flange (and hence casing 208) to left sidewall 122 of the vehicle.

Casing 208, like the three other casings of the vehicle, supports the weight of the vehicle as it travels over the ground. The weight of the vehicle is transmitted from the chassis to the flanges, and thence through axle bearings located in the casing to the axle. The weight on the axle is thence transmitted to the ground. Casing 208, unlike gearbox 134, is a vehicle weight-bearing structural member of the vehicle.

Axle housing 138 includes a cover 214 that is bolted to and encloses casing 208. Two bearings 216 and 218 are fixed to and supported by cover 214. These bearings, in turn, support axle 220 and gear shaft 222 for rotation at their inner ends. Bolts 224 extend through holes in cover 214 into casing 208 where they are threadedly engaged with casing 208 to fix cover 214 thereto.

Axle housing 138 also includes a speed-reducing bevel gear set 226, including bevel pinion gear 228 that is coupled to and rotates with the rearward end of driveshaft 136. Gear set 226 also includes bevel gear 230 that is meshingly engaged to and rotates with bevel gear 228.

Bevel gears 228 and 230 preferably rotate about axes disposed at a right angle to one another. Bevel gear 230 is supported for rotation on and is fixed to gear shaft 222. Both gear shaft 222 and driveshaft 136, which are coaxial with their associated bevel gears 230 and 228 mounted thereon, also lie in a horizontal plane and rotate about axes at right angles to one another—the same axes about which gears 230 and 228 rotate.

Gear shaft 222 is supported within axle housing 138 by two bearings 218 and 232. Bearing 232 is mounted to casing 208 itself, and bearing 218 is mounted to cover 214.

Rear axle housing 138 also includes a second speed reducing spur gear set 234. This gear set is also disposed inside the front axle housing and includes two spur gears 236 and 238 that are fixed to axle 220 and gear shaft 222, respectively. The gear set is a speed reducing gear set because there are fewer teeth on gear 238 than are on gear 236. This difference in the number of teeth causes gear shaft 222 to rotate at a higher speed than axle 220, thereby providing a speed reduction.

Axle 220 is supported within casing 208 by two bearings 216 and 240 that are spaced apart with respect to each other. Cover 214 supports bearing 216 and casing 208 supports bearing 240. It is these bearings that transmit the weight of the vehicle from casing 208 to axle 220 and thence to wheel 110 and the ground.

Wheel 110 (FIG. 2) is fixed to a flange 242 that extends radially outward from the outboard end of axle 220, using a plurality of lug bolts that pass through openings in the rim of the wheel to which lug nuts are fastened.

As best shown in FIG. 2, an identical drive system is disposed on the right side of the vehicle that is a mirror image of the drive system on the left side of the vehicle. It is the same in all respects as the drive system on the left side of the vehicle, and therefore is not separately described herein. The front axles of the left and right side drive systems of the vehicle are preferably coaxial. The rear axles of the left and right side drive systems are also preferably coaxial.

Figure 7:
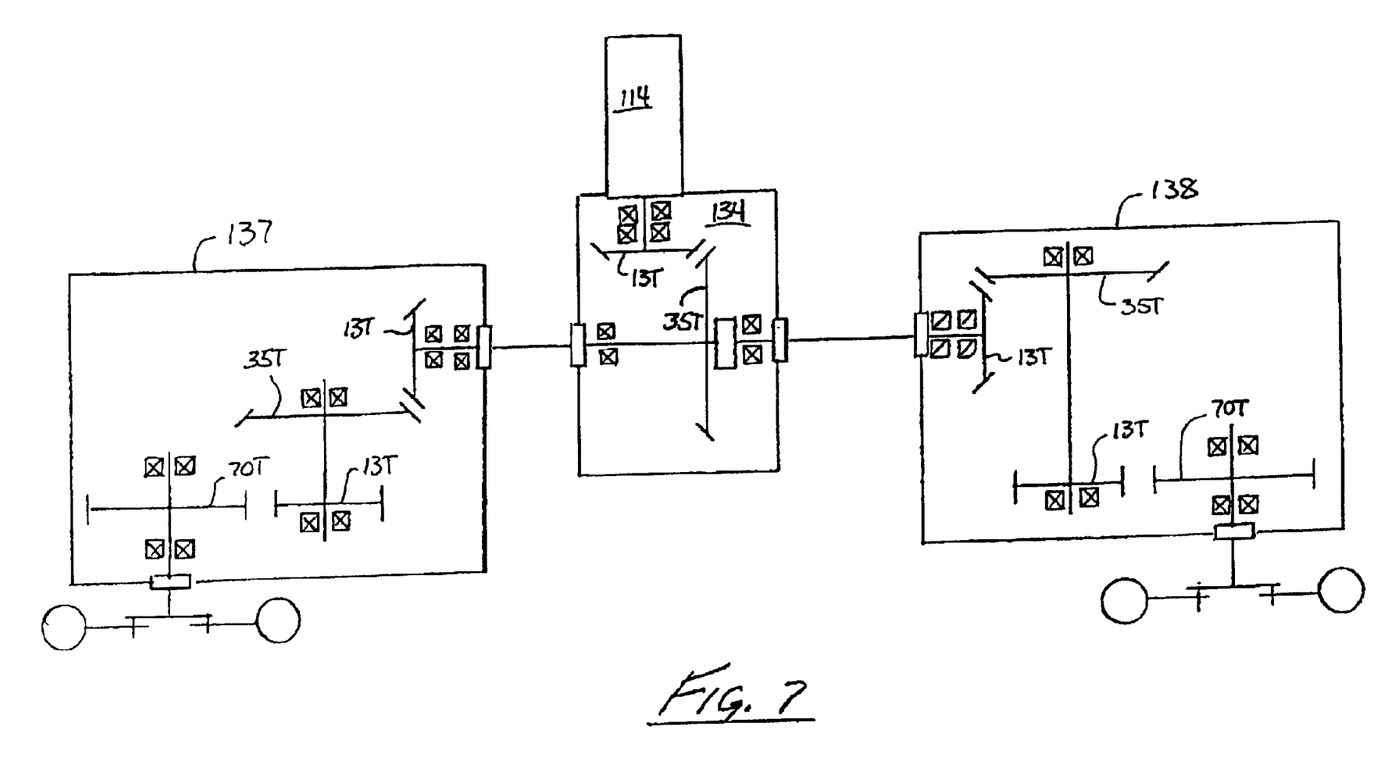
FIG. 7 is a schematic diagram of the left side drive system showing the various gear reductions.

FIG. 7 is a diagram of the reduction gear ratios provided by the drive systems and is illustrated in schematic form. Gear set 152, the bevel gear set in gearbox 134 provides a gear reduction of 35:13. Bevel pinion gear 158 has 13 teeth and bevel gear 168 has 35 teeth. This gear reduction is preferably between 2:1 and 3:1.

In front axle housing 137, the first speed-reducing gear set 190 provides a gear reduction of 35:13 or 2.7:1. Gear 192 has 13 teeth and gear 194 has 35 teeth. This gear reduction is preferably between 2:1 and 3:1.

The second speed-reducing gear set 198 in front axle housing 137 provides a gear reduction of 70:13. Gear 202 has 13 teeth and gear 200 has 70 teeth. This gear reduction is preferably between 4.25:1 and 6.5:1.

In rear axle housing 138, the first speed-reducing gear set 226 provides a gear reduction of 35:13. Gear 228 has 13 teeth and gear 230 has 35 teeth. This gear reduction is preferably between 2:1 and 3:1.

The second speed-reducing gear set 234 in rear axle housing 138 provides a gear reduction of 70:13. Gear 238 has 13 teeth and gear 236 has 70 teeth. This gear reduction is preferably between 4.25:1 and 6.5:1.

The overall gear reductions of both the illustrated front and rear axle housings 137 and 138 are 2450:169 or 14.5:1. A preferred gear reduction for the axle housings is between 10:1 and 25:1.

It is preferable that gears 200 and 236 have the same number of teeth. It is preferably that gears 202 and 238 have the same number of teeth. It is preferable that gears 194 and 230 have the same number of teeth. It is preferably that gears 192 and 228 have the same number of teeth. It is preferably that gear 194 and shaft 186 are net forged to form a single integral and unitary structure having the same composition throughout. It is preferably that gear 230 and shaft 222 are net forged to provide a single integral and unitary structure having the same composition throughout. It is also preferable that the overall gear reduction ratios of both front and rear axle housings is the same.

The actual ratio of the overall gear reduction of gearbox 134 with respect to the overall gear reduction of the front and rear axle housings is 2.7 (gearbox 134) to 14.5 (the axle housings), or a factor of 0.186. The preferred factor is between 0.28 and 0.133.

While the discussion above relates to the drive system for the left side of the vehicle, the same number of gear teeth, gear ratios and desirable gear ratios would be the same for the drive system on the opposing side of the vehicle as well.

Figure 8:
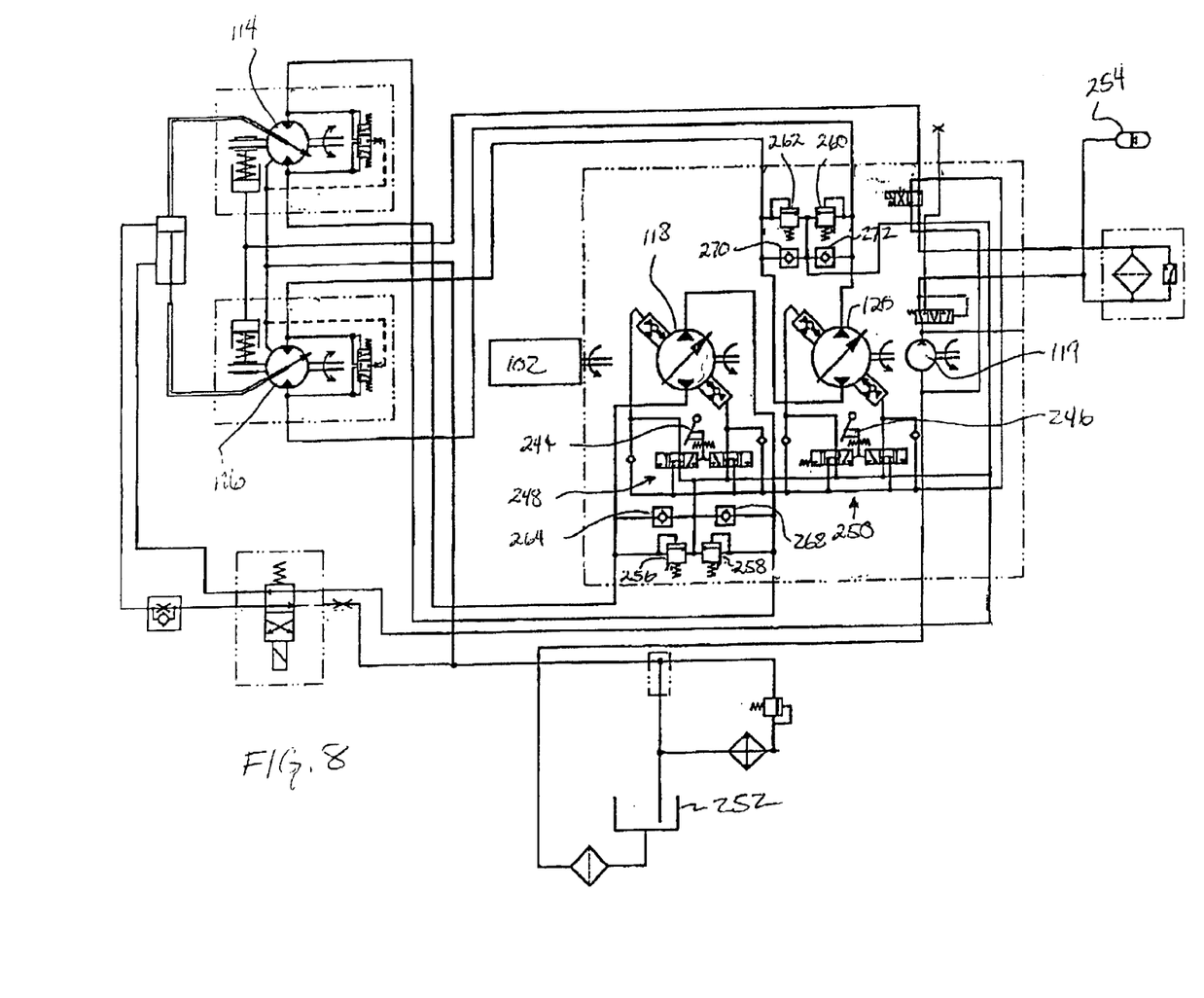
FIG. 8 is a schematic diagram of a hydraulic drive circuit indicating how pumps 118 and 120 are coupled to motors 114 and 116 to supply them with hydraulic fluid and thereby drive the vehicle over the ground.

FIG. 8 illustrates the hydraulic circuit for driving the skid steer vehicle. It includes engine 102 that is coupled to and drives hydraulic pumps 118 and 120, which, in turn, are hydraulically coupled to and drive hydraulic motors 114 and 116, respectively.

Pumps 118 and 120 are variable displacement hydraulic pumps, which are hydraulically coupled to two respective hand controls 244 and 246 for controlling the displacement of the pumps. Hand controls 244 and 246 are respectively mechanically coupled to and control the position of hydraulic valves 248 and 250. Hydraulic valves 248 and 250, are, in turn, hydraulically coupled to pumps 118 and 120 to vary the displacement of these pumps. The displacement of the pumps can be not only varied in magnitude, but in direction, as well. By manipulating each of the hand controls away from a neutral position in a first direction, hydraulic fluid can be made to flow in a first direction through the associated pump. By manipulating each of the hand controls away from a central neutral position in a second, and opposing direction, hydraulic fluid can be made to flow in a second opposite direction through the associated pump.

Pumps 118 and 120 are in fluid communication with motors 114 and 116, respectively. More particularly, pump 118 is in a series hydraulic circuit with motor 114 and pump 120 is in a series hydraulic circuit with motor 116. These two circuits are independent. Substantially all the hydraulic fluid provided by pump 118 is directed to and through motor 114 and substantially all the hydraulic fluid provided by pump 120 is directed to and through motor 116.

Motors 114 and 116 are bi-directional. In other words, they will turn in both directions depending upon the direction of fluid flow through the motors. Thus, when the hand controls are manipulated, they can drive the wheels on each side of the vehicles independently of the wheels on the other side of the vehicle. They can drive the wheels on both sides of the vehicle forward (and at different or the same speed). They can drive the wheels on opposing sides of the vehicle backwards (and at the same or different speeds). They can drive the wheels on opposing sides of the vehicle in opposite directions and at the same or different speeds. By "opposite directions" we mean that the wheels on one side of the vehicle can be driven in a direction to move that side of the vehicle forward and the wheels on the opposing side of the vehicle can be driven in a rotational direction that will move that side of the vehicle backward.

A third pump is provided in FIG. 8, called charge pump 119. Charge pump 119 is in fluid communication with hydraulic motors 114 and 116, and hydraulic pumps 118 and 120 to provide "make-up" hydraulic fluid for the hydraulic circuits extending between with hydraulic motors 114 and 116, and hydraulic pumps 118 and 120. These circuits may leak, and they may lose fluid when overpressurized. As a result, some means to supply them with additional hydraulic fluid is required. Hydraulic charge pump 119 provides that capability. Charge pump 119 sucks fluid from tank 252 and supplies it under pressure to accumulator 254. Accumulator 254, in turn, is in fluid communication with the series drive circuits and supplies them with hydraulic fluid to make up their losses.

The two series hydraulic circuits that extend between pump 118 and motor 114 and between pump 120 and motor 116 are provided with pressure relief and anti-cavitation valves.

The series circuit including pump 118 and motor 114 also includes back to-back pressure relief valves 256 and 258 that are in fluid communication with the two respective conduits extending from pump 118 to motor 114. These valves 256 and 258 are also coupled to tank 252. When the pressure in either conduit exceeds the operating pressure, the pressure relief valve opens and conducts fluid back to tank 252. Pressure relief valves 260 and 262 are similarly coupled to the two conduits extending between pump 120 and motor 116 to provide the same function.

The series circuit including pump 118 and motor 114 also includes back-to-back anti-cavitation valves 264 and 268, each coupled in parallel with pressure relief valves 256 and 258. These valves are essentially check valves that permit fluid from tank 252 to be sucked into the conduits extending between pump 118 and motor 114 whenever the pressure in those conduits approaches zero psi. By permitting hydraulic fluid to be sucked back into these conduits, the pressure in the conduits is maintained above that at which the hydraulic fluid would flash into vapor—i.e. cavitation pressure. Another pair of anti-cavitation valves 270 and 272 is similarly coupled to and between the hydraulic lines that extend between pumps 120 and motor 116, and tank 252 to provide the same anti-cavitation function for the hydraulic circuit that controls the motors on the right-hand side of the vehicle.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A skid steer vehicle, comprising:
   a chassis having first and second sidewalls;
   an engine mounted to the chassis and having at least first and second hydraulic pumps; and
   first and second drive systems, disposed adjacent to the first and second sidewalls, respectively, each drive system including:
   a hydraulic motor having an output shaft with an axis of rotation;
   a gearbox coupled to the hydraulic motor and including a first reduction gear set driven by the hydraulic motor;
   a driveshaft having an axis of rotation, the driveshaft extending from the gearbox and having a first end disposed forward of the gearbox and a second end disposed rearward of the gearbox;
   a first axle housing assembly including a first axle housing coupled to the first end of the driveshaft and a first axle that extends laterally outward away from the first axle housing, the first axle housing assembly housing at least second and third reduction gear sets;
   a second axle housing assembly including a second axle housing coupled to the second end of the driveshaft and a second axle that extends laterally outward away from the second axle housing, the second axle housing assembly housing at least fourth and fifth reduction gear sets; and
   a wheel driven by one of the first and second axles;
   wherein the hydraulic motor of the first drive system is fluidly coupled to the first hydraulic pump to be driven thereby and further wherein the hydraulic motor of the second drive system is fluidly coupled to the second hydraulic pump to be driven thereby, and
   wherein the first reduction gear set includes a speed-reducing bevel gear set, the third speed-reducing gear set is a bevel gear set, one of the fourth and fifth speed-reducing gear sets is a bevel gear set and another of the fourth and fifth speed-reducing gear sets is a spur gear set, and the first axle housing assembly includes a first internal shaft that is disposed parallel to the first axle and the second reduction gear set includes a first spur gear mounted on the first axle and a second spur gear mounted on the first internal shaft.

2. The vehicle of claim 1, wherein the second axle housing assembly includes a second internal shaft that is disposed parallel to the second axle and further wherein the fourth reduction gear set is the speed-reducing spur gear set and includes a third spur gear mounted on the first axle and a fourth spur gear mounted on the second internal shaft.

3. The vehicle of claim 2, wherein the first axle housing assembly includes a first bevel gear mounted on the first internal shaft and a second bevel gear in mating engagement with the first bevel gear, and further wherein the third speed-reducing gear set comprises the first and second bevel gears.

4. The vehicle of claim 3, wherein the second axle housing assembly includes a third bevel gear mounted on the second internal shaft and a fourth bevel gear in mating engagement with the third bevel gear, and further wherein the fifth speed-reducing gear set comprises the third and fourth bevel gears.

5. The vehicle of claim 4, wherein the first reduction gear set of the gearbox is a bevel gear set.

6. A drive system for a skid steer vehicle, comprising:
a hydraulic motor having an output shaft with an axis of rotation;
a gearbox coupled to the hydraulic motor and including a first reduction gear set driven by the hydraulic motor;
a driveshaft having an axis of rotation, the driveshaft extending from the gearbox and having a first end disposed forward of the gearbox and a second end disposed rearward of the gearbox;
a first axle housing assembly including a first axle housing coupled to the first end of the driveshaft and a first axle that extends laterally outward away from the first axle housing, the first axle housing assembly housing at least second and third reduction gear sets;
a second axle housing assembly including a second axle housing coupled to the second end of the driveshaft and a second axle that extends laterally outward away from the second axle housing, the second axle housing assembly housing at least fourth and fifth reduction gear sets; and
at least two wheels, driven by one of the first and second axles,
wherein the first reduction gear set includes a speed-reducing bevel gear set, the third speed-reducing gear set is a bevel gear set, the fifth speed-reducing gear set is a bevel gear set, the first axle housing assembly includes a first internal shaft that is disposed parallel to the first axle, the second reduction gear set includes a first spur gear mounted on the first axle and a second spur gear mounted on the first internal shaft, the second axle housing assembly includes a second internal shaft that is disposed parallel to the second axle and the fourth reduction gear set includes a third spur gear mounted on the first axle and a fourth spur gear mounted on the second internal shaft.

7. The drive system of claim 6, wherein the first axle housing assembly includes a first bevel gear mounted on the first internal shaft and a second bevel gear in mating engagement with the first bevel gear, and further wherein the third speed-reducing gear set comprises the first and second bevel gears.

8. The drive system of claim 7, wherein the second axle housing assembly includes a third bevel gear mounted on the second internal shaft and a fourth bevel gear in mating engagement with the third bevel gear, and further wherein the fifth speed-reducing gear set comprises the third and fourth bevel gears.

9. The drive system of claim 8, wherein the driveshaft is a single elongate member extending through the gearbox and engaging both the first axle housing assembly and the second axle housing assembly.

10. The drive system of claim 8, wherein the driveshaft drivingly engages both the second and fourth bevel gears.

11. A skid steer vehicle, comprising:
a chassis having a right side, a left side, a front and a back;
an engine mounted to the chassis and including at least first and second hydraulic pumps; and
a right hydraulic motor driven by the first hydraulic pump;
a right gearbox including a gear set driven by the right hydraulic motor;
a right driveshaft having an axis of rotation, the right driveshaft extending from the right gearbox and having a front end disposed forward of the gearbox and a rear end disposed rearward of the gearbox;
a right-front axle assembly including a right-front axle housing drivingly coupled to the front end of the right driveshaft and a right-front axle that extends laterally outward away from the right-front axle housing, which houses at least one gear set;
a right-rear axle assembly including a right-rear axle housing drivingly coupled to the rear end of the right driveshaft and a right-rear axle that extends laterally outward away from the right-rear axle housing, which houses at least one gear set;
a right-front wheel driven by the right-front axle;
a right-rear wheel driven by the right-rear axle;
a left hydraulic motor driven by the second hydraulic pump;
a left gearbox including a gear set driven by the left hydraulic motor;
a left driveshaft having an axis of rotation, the left driveshaft extending from the left gearbox and having a front end disposed forward of the gearbox and a rear end disposed rearward of the gearbox;
a left-front axle assembly including a left-front axle housing drivingly coupled to the front end of the left driveshaft and a left-front axle that extends laterally outward away from the left-front axle housing, which houses at least one gear set;
a left-rear axle assembly including a left-rear axle housing drivingly coupled to the rear end of the left driveshaft and a left-rear axle that extends laterally outward away from the left-rear axle housing, which houses at least one gear set;
a left-front wheel driven by the left-front axle; and
a left-rear wheel driven by the left-rear axle,
wherein the left hydraulic motor drives the left-front and left-rear wheels through at least the left gearbox and the left driveshaft and the right hydraulic motor drives the right-front and right-rear wheels through at least the right gearbox and the right driveshaft.

* * * * *